United States Patent
Narula et al.

(10) Patent No.: US 11,563,755 B2
(45) Date of Patent: Jan. 24, 2023

(54) MACHINE-LEARNING BASED APPROACH FOR DYNAMICALLY GENERATING INCIDENT-SPECIFIC PLAYBOOKS FOR A SECURITY ORCHESTRATION, AUTOMATION AND RESPONSE (SOAR) PLATFORM

(71) Applicant: Fortinet, Inc., Sunnyvale, CA (US)

(72) Inventors: Abhishek Narula, Pune (IN); Christopher Carsey, Tucson, AZ (US); Amit Jain, Pune (IN); Pooja Singh, Pune (IN)

(73) Assignee: Fortinet, Inc., Sunnyvale, CA (US)

( * ) Notice: Subject to any disclaimer, the term of this patent is extended or adjusted under 35 U.S.C. 154(b) by 325 days.

(21) Appl. No.: 16/827,952

(22) Filed: Mar. 24, 2020

(65) Prior Publication Data
US 2021/0306352 A1    Sep. 30, 2021

(51) Int. Cl.
*H04L 29/06* (2006.01)
*G06N 5/04* (2006.01)
(Continued)

(52) U.S. Cl.
CPC .......... *H04L 63/1416* (2013.01); *G06N 5/04* (2013.01); *G06N 20/00* (2019.01); *H04L 63/1425* (2013.01)

(58) Field of Classification Search
CPC ............. H04L 63/1408; H04L 63/1416; H04L 63/1425; G06N 5/04; G06N 20/00; G06F 21/55
See application file for complete search history.

(56) References Cited

U.S. PATENT DOCUMENTS

| 7,716,739 B1 * | 5/2010 | McCorkendale | ....... G06F 21/55 726/25 |
| 10,439,884 B1 * | 10/2019 | Forte | .................. H04L 63/1425 |

(Continued)

OTHER PUBLICATIONS

Brandon Enright. "Using a 'Playbook' Model to Organize Your Information Security Monitoring Strategy" Published Nov. 1, 2013 (9 pages) https://blogs.cisco.com/security/using-a-playbook-model-to-organize-your-information-security-monitoring-strategy (Year: 2013).*

*Primary Examiner* — Joseph P Hirl
*Assistant Examiner* — Thomas A Gyorfi
(74) *Attorney, Agent, or Firm* — HDC Intellectual Property Law, LLP

(57) ABSTRACT

Systems and methods for a machine-learning based approach for dynamically generating incident-specific playbooks for a security orchestration and automated response (SOAR) platform are provided. The SOAR platform captures information regarding execution of a sequence of actions performed by analysts responsive to a first incident of a first type. The captured information is fed into a machine-learning model. When a second incident, observed by the SOAR platform, is similar in nature to the first incident or the first type a recommended sequence of actions is generated based on the machine-learning model for use by an analyst in connection with responding to the second incident. In response to rejection of the recommended sequence by the analyst, revising the recommended sequence based on input provided by the analyst and storing the revised recommendation sequence in a form of a revised playbook for response to subsequent incidents that are similar to the second incident.

20 Claims, 12 Drawing Sheets

(51) Int. Cl.
  *G06N 20/00*    (2019.01)
  *H04L 9/40*    (2022.01)

(56) References Cited

U.S. PATENT DOCUMENTS

2017/0063901 A1* 3/2017 Muddu .................... H04L 43/08
2020/0127976 A1* 4/2020 Neystadt ............. H04L 63/1408
2020/0401703 A1* 12/2020 Storms ................ G06F 11/3409

* cited by examiner

FIG. 3B

MACHINE-LEARNING BASED APPROACH FOR DYNAMICALLY GENERATING INCIDENT-SPECIFIC PLAYBOOKS FOR A SECURITY ORCHESTRATION, AUTOMATION AND RESPONSE (SOAR) PLATFORM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to generation of playbooks to facilitate enrichment, triaging and/or remediation of incidents in the context of a security orchestration and automated response (SOAR) platform. In particular, embodiments of the present invention relate to a machine-learning based approach to dynamically generate incident-specific playbooks by observing and learning based on actions taken by analysts with respect to similar incidents.

Description of the Related Art

In recent years, technology has developed to address new security issues because of rapid evolution in the field of information technology. For example, modern Security Operation Centers (SOCs) employ "playbooks" to help automate steps of a workflow performed by an analyst to enrich, triage and/or remediate an incident. Playbooks include "plays" that may be represented in the form of complex queries that can be run against data including alerts from security products and activity logs from network and endpoint devices, network metadata, and full/partial packet captures.

SOC analysts largely follow procedures for investigation of a particular type of incident on a SOAR platform, where outcomes of executed steps aid in determining the next step. The lifecycle of an incident in a SOAR platform involves multiple stages including, but not limited to, ingestion, enrichment, triaging and remediation. As each phase includes a multi-step process and next steps are largely defined based on outcomes of previously executed one or multiple steps, automating the procedures into canned playbooks becomes complex.

A playbook building interface of a SOAR platform comprises steps, routes, and decisions and forms/variables that provide input to the steps. The process of creating a playbook using traditional techniques can be tedious, especially when a user does not have a well-defined process that they are automating. In addition, there is a learning curve for turning SOC processes into working playbooks. When there are different types of incidents to automate, the development process of playbooks can slow down progress towards automation. Further, any new incident types that are observed at the SOC may require a new playbook development cycle, which may not work in the same manner as the incidents that already have a playbook. Therefore, there is a need for developing an intelligent approach for automating generation of playbooks for various incidents.

SUMMARY

Systems and methods are described for a machine-learning based approach for dynamically generating incident-specific playbooks for a security orchestration and automated response (SOAR) platform. The SOAR platform captures information regarding execution of a sequence of actions performed by analysts responsive to a first incident of a first type. The captured information is fed into a machine-learning model. When a second incident, observed by the SOAR platform, is similar in nature to the first incident or the first type a recommended sequence of actions is generated based on the machine-learning model for use by an analyst in connection with responding to the second incident. In response to rejection of the recommended sequence by the analyst, revising the recommended sequence based on input provided by the analyst and storing the revised recommendation sequence in a form of a revised playbook for response to subsequent incidents that are similar to the second incident.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 3A-D illustrate exemplary screen shots of a user interface of a SOAR platform relating to automatic generation and use of playbooks in accordance with an embodiment of the present invention.

DETAILED DESCRIPTION

Figure 1:
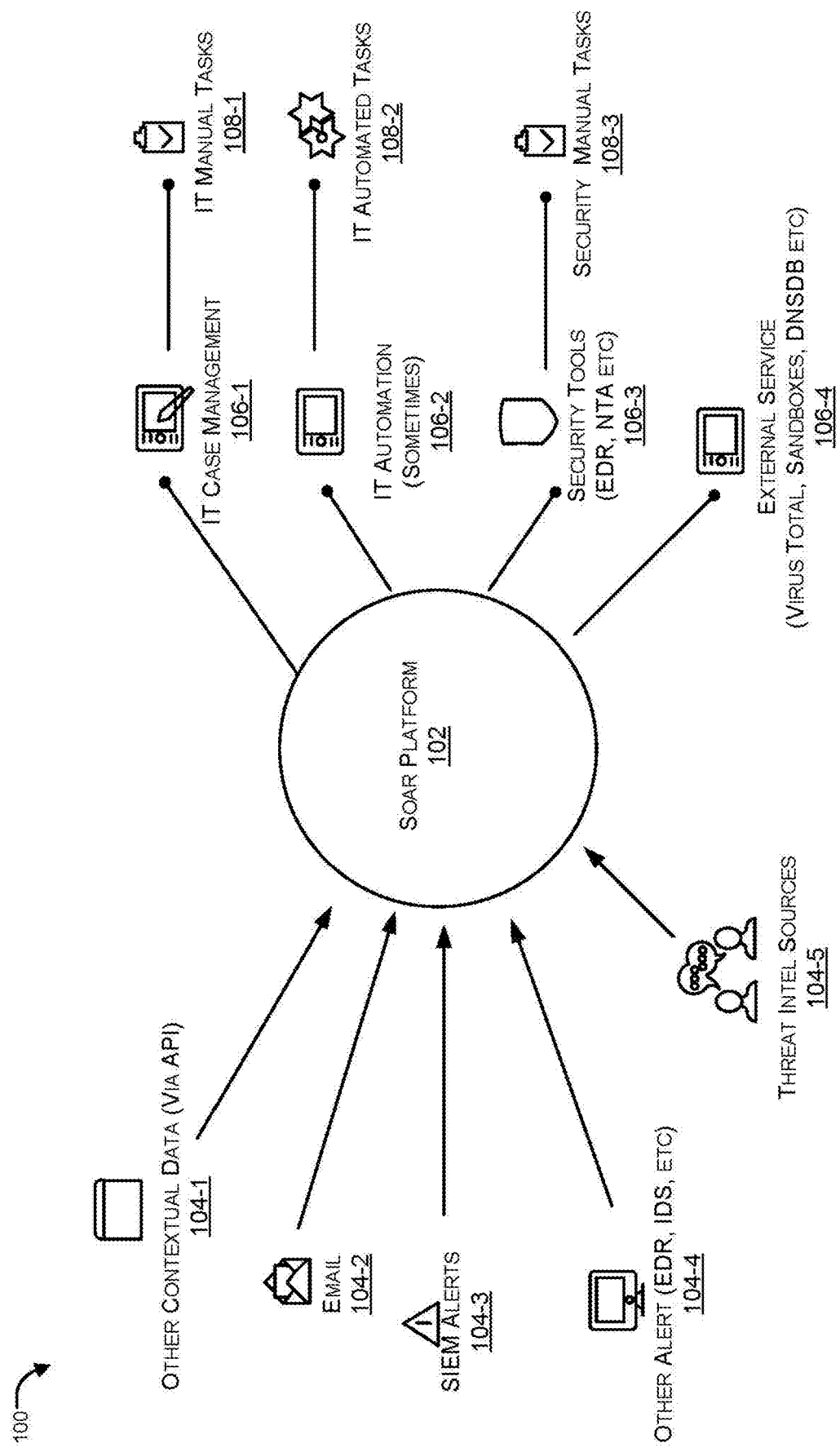
FIG. 1 is a network architecture in which aspects of the present invention may be implemented in accordance with an embodiment of the present invention.

Systems and methods are described for generating incident-based playbook for a security orchestration and automated response (SOAR) platform. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein an "incident" generally refers to any malicious act or suspicious event observed within a private network. Such malicious acts typically (i) compromise or represent an attempt to compromise the logical border surrounding a network to which assets (e.g., programmable electronic devices and communication networks including hardware, software, and data) are connected and for which access is controlled or (ii) disrupt or represent an attempt to disrupt such assets. Non-limiting examples of types or classes of incidents include unauthorized attempts to access systems or data, privilege escalation attacks, unusual behavior from privileged user accounts, insider threats (e.g., insiders trying to access servers and data that isn't related to their jobs, logging in at abnormal times from unusual locations, or logging in from multiple locations in a short time frame), anomalies in outbound network traffic (e.g., uploading large files to personal cloud applications, downloading large files to external storage devices, or sending large numbers of email messages with attachments outside the company), traffic sent to or received from unknown locations, excessive consumption of resources (e.g., processing, memory and/or storage resources), changes in configuration (e.g., reconfiguration of services, installation of startup programs, the addition of scheduled tasks, changes to security rules or firewall changes), hidden files (may be considered suspicious due to their file names, sizes or locations and may be indicative that data or logs may have been leaked), unexpected changes (e.g., user account lockouts, password changes, or sudden changes in group memberships), abnormal browsing behavior (e.g., unexpected redirects, changes in browser configuration, or repeated pop-ups), suspicious registry entries, phishing attacks, malware attacks, denial-of-service (DoS) attacks, man-in-the-middle attacks, and password attacks.

As used herein "indicators of compromise" or simply "indicators" generally refer to pieces of forensic data that identify potentially malicious activity on a system or network. Non-limiting examples of such data include data found in system log entries or files. Indicators of compromise may aid information security and IT professionals in detecting data breaches, malware infections, or other threat activity. By monitoring for indicators of compromise, organizations can detect attacks and act quickly to prevent breaches from occurring or limit damages by stopping attacks in earlier stages. Non-limiting examples of indicators of compromise include unusual outbound network traffic, anomalies in privileged user account activity, geographical irregularities, log-in red flags, increases in database read volume, Hypertext Markup Language (HTML) response sizes, large numbers of requests for the same file, mismatched port-application traffic, suspicious registry or system file changes, unusual DNS requests, unexpected patching of systems, mobile device profile changes, bundles of data in the wrong place, web traffic with unhuman behavior, and signs of distributed DoS (DDoS) activity.

As used herein a first incident or first type of incident is "similar" or "similar in nature" to a second incident or second type of incident when their respective feature sets meet a predetermined or configurable similarity threshold. For example, in one embodiment, two incidents may be considered similar when their names or types are similar and when similar indicators are linked to both. In one embodiment, attributes associated with incident metadata (e.g., name, description, severity, phase, status, type, date, and the like) may constitute a feature set. Depending upon the particular implementation, the feature set for computing similarity may be configurable. For example, analysts or an administrator may be provided with the ability to select attributes from the incident metadata that will represent the feature set. The attributes available for selection to be included as part of a feature set may also include metadata collected from other sources (e.g., threat intel sources, SIEM, security tools, logs, and the like). In one embodiment, Term Frequency-Inverse Document Frequency (TF-IDF) similarity is used to identify similar incidents. In some embodiments, the similarity threshold may be defined as a percentage (e.g., 80%, 90% or 100%) for incidents to be considered similar. Additionally or alternatively, a timeframe may be considered. For example, only incidents created/observed within a particular timeframe (e.g., one month) may be considered similar to an incident at issue.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

According to various aspects of the present disclosure, an enforcement engine running on or within a security orchestration and automated response (SOAR) platform captures information regarding execution of a sequence of one or more actions performed by one or more analysts responsive to an incident of a first type. The one or more actions include extracting one or more indicators of the incident, determining a reputation score of each of the one or more indicators using a threat source, analyzing a severity level of the incident based on the determined reputation score, and processing incident data of the incident based on the severity level. The captured information is fed into a machine-learning model. Further, in response to a second incident observed by the SOAR platform that is similar in nature to the first type, the enforcement engine generates a recommended sequence of one or more actions for use by an analyst in connection with responding to the second incident. The recommended sequence is generated based on the machine-learning model. Furthermore, upon the authorization of the recommended sequence by the analyst, the enforcement engine executes the recommended sequence for response to the second incident. The recommended sequence is stored in form of a playbook for response to subsequent one or more incidents that are similar to the second incident.

FIG. 1 is a network architecture 100 in which aspects of the present invention may be implemented in accordance with an embodiment of the present invention. In the context of the present example, a SOAR platform 102 may be operatively coupled with a SOC of a monitored network to facilitate receipt of alert data pertaining to an incident. SOAR platform 102 may represent a cloud-based SOAR service or a platform provided by a managed security service provider (MSSP). Alternatively or additionally, SOAR platform 102 may include an on-premise SOAR platform that receives data from a wide range of different sources. According to one embodiment, SOAR platform 102 is operable to apply decision making logic, combined with context, to provide formalized workflows and enable informed prioritization (triage) of remediation tasks relating to threats observed at the SOC.

Those skilled in the art will appreciate that, the monitored network can be a wireless network, a wired network or a combination thereof that can be implemented as one of the different types of networks, such as Intranet, Local Area Network (LAN), Wide Area Network (WAN), Internet, and the like. Further, the monitored network can either be a dedicated network or a shared network. A shared network may represent an association of the different types of networks that use a variety of protocols, for example, Hypertext Transfer Protocol (HTTP), Transmission Control Protocol/Internet Protocol (TCP/IP), Wireless Application Protocol (WAP), and the like.

The threat of a cyberattack can put pressure on the SOC, leading to operational disruption of the monitored network, and reputational damage. The SOAR platform 102 may facilitate identification and responding to cyberattacks by processing a large volume of alert and log data that may contain information indicative of the type and nature of an attack that may be underway. In an embodiment, the SOAR platform 102 is operable to receive and process actionable alert data pertaining to an alert, such as a phishing alert, for example, related to contextual data via Application Programming Interface (API) 104-1. API 104-1 can enable determining security alerts from multiple sources along with contextual data. At 104-2 the alert data can pertain to and alert the SOAR platform 102 regarding the receipt of a phishing email, for example, by a mail server of the monitored network. Phishing emails may be identified based on uniform resource locator (URL)/uniform resource identifier (URI) information, Internet Protocol (IP) addresses, and/or email addresses. Further, the received actionable alert data at 104-3 can be a Security Information and Event Management (SIEM) alert. SIEM tools may generate SIEM alerts, for example, by aggregating data from different internal sources of the monitored network to identify anomalous behavior that may be indicative of a cyberattack. Furthermore, other actionable alerts can be received at 104-4 by SOAR platform 102, for example, from solutions and software applications related to Endpoint Detection and Response (EDR) tools and/or services, an Intrusion Detection System (IDS) and so forth. Additional actionable alerts can be received by the SOAR platform 102 from threat intel sources at 104-5. In an embodiment, additional actionable alerts can be received by the SOAR platform 102, for example, from susceptible indicators, syslog, manually created alerts and so forth.

As an example, SOAR platform 102 may analyze the received alert data so identify and make use of various resources (e.g., information technology (IT) case management 106-1, IT automation 106-2, security tools 106-3, and external services 106-4) to efficiently investigate, manage and/or mitigate the threats. An analyst may perform one or more IT manual tasks 108-1 as part of an incident response or assign may make use of IT case management 106-1 to assign performance of such tasks by an IT administrator, for example. Additionally or alternatively, an analyst may make use of IT automation tools 106-2 to perform one or more IT automated tasks 108-2. In some cases, the threat may be analyzed by performing one or more security manual tasks 108-3 with security tools 106-3 (e.g., EDR, network traffic analysis (NTA) and the like). For example, responsive to an particular incident or type of incident an analyst may take remedial actions (e.g., disable a user account, block a particular IP address or URL, etc.) or collect additional information regarding the incident. Similarly, an analyst may make use of various external services 106-4 as part of an incident investigation. For example, an analyst may query a Domain Name System Database (DNSDB) to find related DNS digital artifacts to a suspicious domain or IP address.

Figure 2:
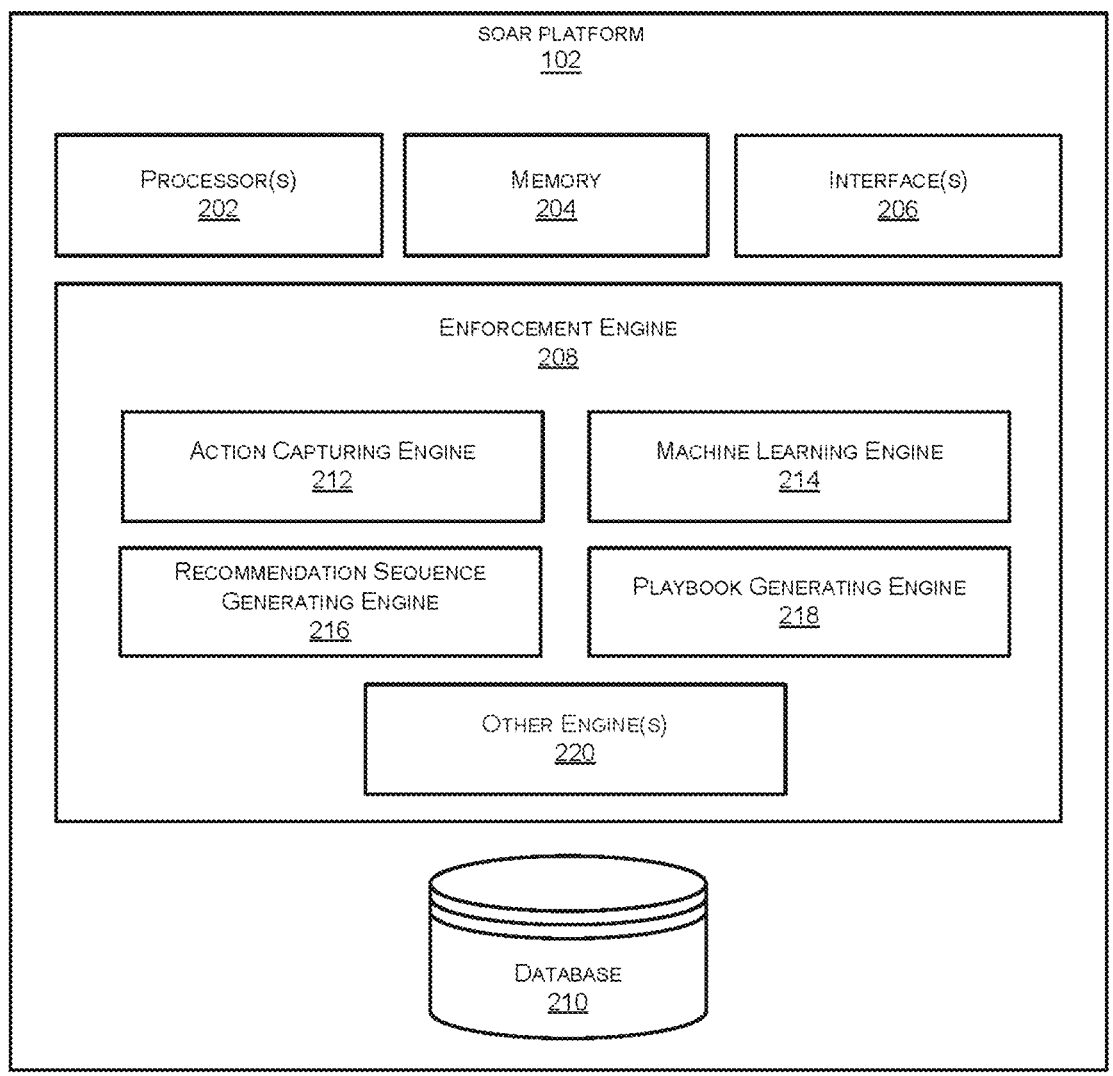
FIG. 2 is a block diagram illustrating functional components of a SOAR platform in accordance with an embodiment of the present invention.

FIG. 2 is a block diagram 200 illustrating functional components of a SOAR platform 102 in accordance with an embodiment of the present invention. In the context of the present example, the SOAR platform 102 includes one or more processing resources (e.g., processor(s) 202). Processor(s) 202 may be implemented as one or more microprocessors, microcomputers, microcontrollers, digital signal processors, central processing units, logic circuitries, and/or any devices that manipulate data based on operational instructions. Among other capabilities, processor(s) 202 are operable to fetch and execute computer-readable instructions stored in a memory 204. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

The SOAR platform 102 may also include one or more interface(s) 206. Interface(s) 206 may include a variety of interfaces, for example, interfaces for data input and output devices, referred to as I/O devices, storage devices, and the like. Interface(s) 206 may facilitate communication among SOAR platform 102 and various devices. Interface(s) 206 may also provide a communication pathway for one or more components of SOAR platform 102. Examples of such components include, but are not limited to, enforcement engine(s) 208 and database 210.

Enforcement engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, SOAR platform 102 may include the machine-readable storage medium storing the instructions and the processing resource to execute the instructions, or the machine-readable storage medium may be separate but accessible to SOAR platform 102 and the processing resource(s). In other examples, enforcement engine(s) 208 may be implemented by electronic circuitry. Database 210 can include data that is either stored or generated as a result of functionalities implemented by any of the components of enforcement engine(s) 208.

In an example, enforcement engine(s) 208 can include an action capturing engine 212, a machine learning engine 214, a recommendation sequence generating engine 216, a playbook generating engine 218. Other engine (s) 220 can implement functionalities that supplement applications or functions performed by SOAR platform 102 or enforcement engine 208.

In an embodiment, action capturing engine 212 can use an enforcement engine 208 running on the SOAR platform 102 to capture information regarding execution of a sequence of one or more actions performed by analysts responsive to an incident of a first type. The actions may include, but are not limited to, extraction of indicators associated with the incident, obtaining a reputation score of each of the one or more indicators from a threat source, obtaining additional information regarding the incident from one or more security tools, determining a severity level of the incident, and otherwise processing incident data.

In an embodiment, machine learning engine 214 can feed the captured information into a machine-learning model. For example, a term frequency-inverse document frequency (TF-IDF) mechanism can be used as statistical measure to evaluate and determine how similar a feature set associated with an incident being evaluated is to feature sets associated with one or more other incidents. According to one embodiment, the feature set for computing similarity amongst the incidents may be configurable. For example, two incidents can be determined to be similar if their names are similar, and similar indicators are linked to both the incidents. The analyst can select additional attributes from a set of attributes defined on incident metadata and the attributes can then constitute the feature set. As will be appreciated by those skilled in the art, incident metadata may include, but is not limited to a name assigned to the threat and other attributes, for example, NetFlow/Internet Protocol Flow Information Export (IPFIX) records, URL/URI information, packet headers, source and destination IP addresses, protocol, payload sizes, whether the payload is encrypted, type of encryption, certificate information, flows, network session data, email addresses, location, time, Session Initiation Protocol (SIP) request information, HTTP response codes, DNS queries, filenames, file hashes, and other indicators. Further, an exact match can be considered while computing similarity of the two incidents. In addition, a type of analyzer applied to the attributes can be configurable in nature.

In an embodiment, recommendation sequence generating engine 216 is responsible for generating a recommended sequence of one or more actions in response to an incident observed by the SOAR platform that is similar in nature to another previously observed incident or an incident of a particular class or type. For example, when an incident at issue is found to be similar to a previously handled incident, the recommended sequence may follow a playbook associated with the previously handled incident. The generated recommended sequence may be used by the analyst to respond to the incident at issue. In some embodiments, the recommended sequence may be generated based on the machine-learning model. Subsequently, in response to authorization of the recommended sequence by the analyst the enforcement engine may execute the recommended sequence in connection with responding to the incident at issue.

In an embodiment, playbook generating engine 218 can facilitate storage of the generated recommendation sequence in a form of a playbook for response to subsequent incidents that are similar to the incident at issue. In connection with generating playbooks, a recommended playbook may be extracted based on various factors (e.g., a similarity score in relation to previously observed incidents and a frequency score of the playbooks associated with the previously observed incidents). When a recommended playbook is used (authorized) by an analyst, the frequency score (or other relevance/trustworthiness metric) for that playbook may be adjusted to increase its relevance going forward.

In one embodiment, if the analyst does not authorize the recommended sequence, the analyst may be prompted to provide investigation notes and/or a rationale for rejecting usage/application of the recommended sequence and such information may be persisted. Additionally, the playbook associated with the incident at issue may be revised accordingly and/or the frequency score may be adjusted to decrease the relevance of the playbook for the type of incident at issue going forward.

In one embodiment, when the recommended playbook is modified by the analyst, an analyst-defined reasoning associated with modification of the recommended playbook may also be recorded. The modified recommended playbook can be stored for use in connection with subsequent incidents that are similar to the incident at issue. In some embodiments, the enforcement engine may provide the recommendation sequence as a suggestion on a graphical user interface (GUI) associated with the SOAR platform and the analyst can authorize or reject the recommended sequence via the GUI.

Figure 3A:
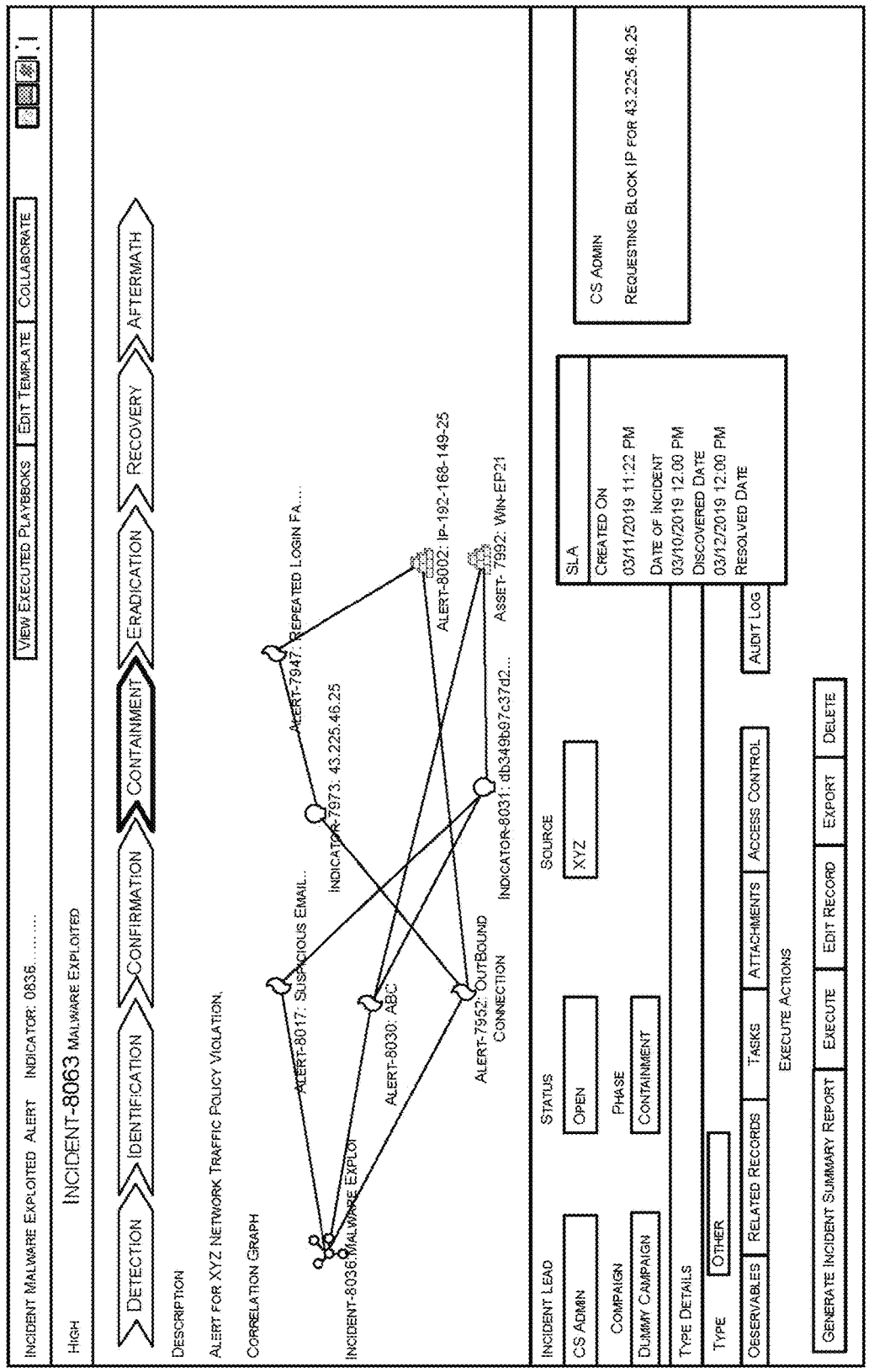
Figure 3B:
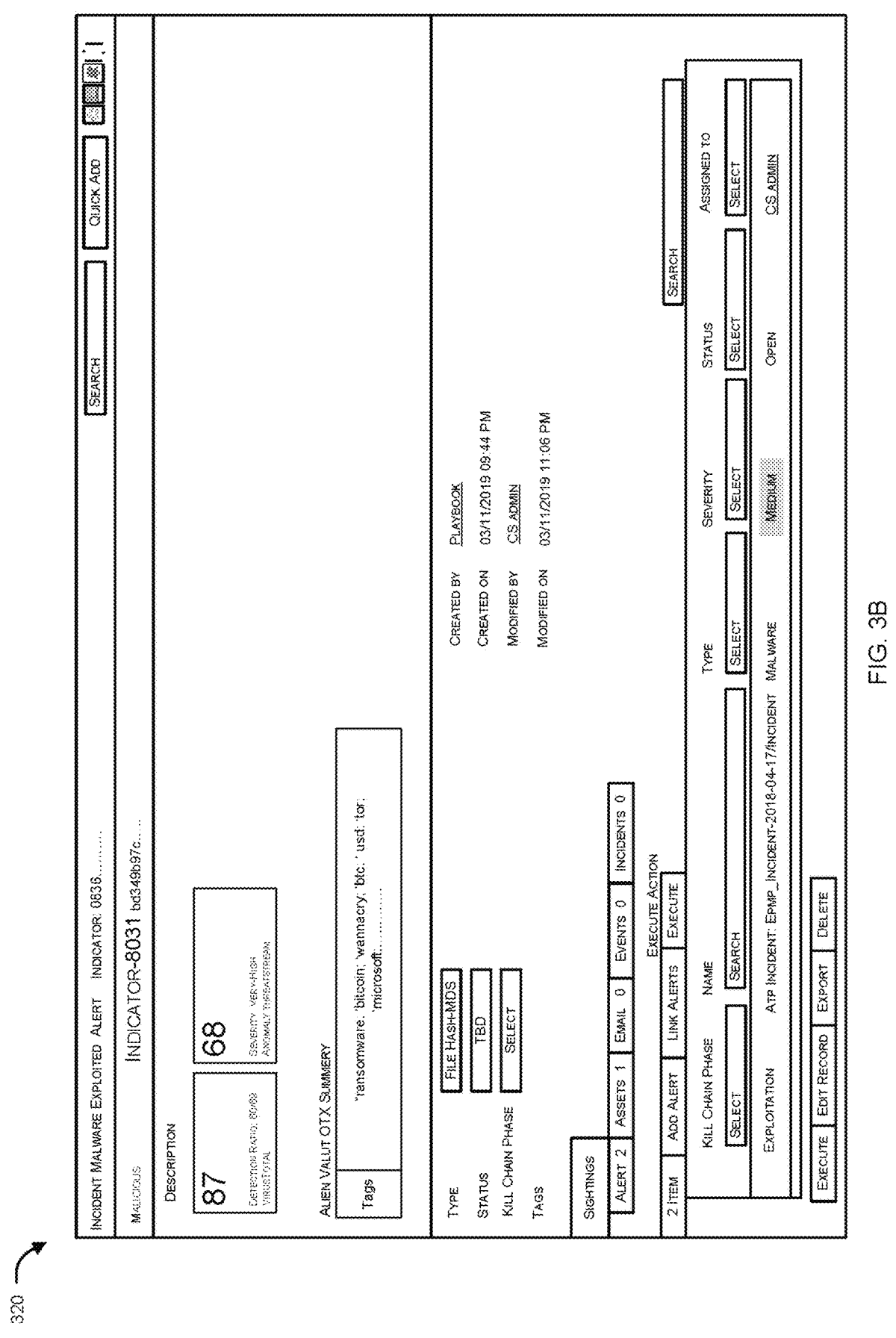

FIGS. 3A-D illustrate exemplary screen shots 300, 320, 340, and 360 of a user interface of a SOAR platform relating to automatic generation and use of playbooks in accordance with an embodiment of the present invention. In FIG. 3A, screen shot 300 presents a set of phases (e.g., detection, identification, confirmation, containment, eradication, recovery, and aftermath) for the incident at issue with the current phase (e.g., containment) highlighted. Screen shot 300 also includes a correlation graph showing correlations among various alerts relating to the incident at issue. In FIG. 3B, screen shot 320 displays information to the analyst related to a particular indicator, for example, selected from the correlation graph depicted in screen shot 300.

Figure 3C:
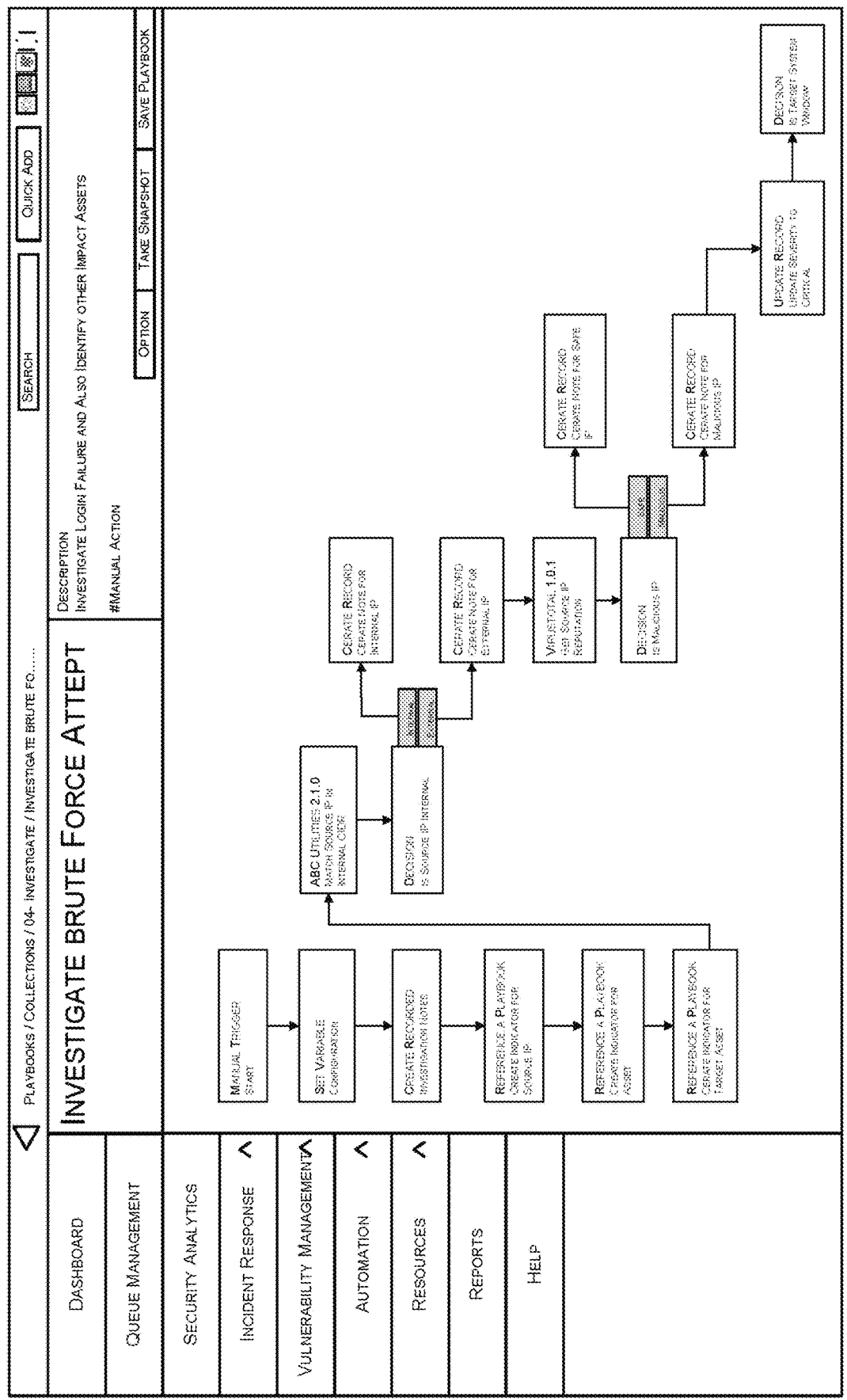

In FIG. 3C, screen shot 340 illustrates an example of a playbook that may be used in connection with investigation of a potential brute force login attempt. According to one embodiment, an incident-specific playbook may be presented in the form of a sequence of steps suggested to be taken by the analyst in connection with the investigation at issue. In the context of the present example, the playbook consists of a graph or a flowchart of suggested steps (an incident sequence) that can be individually executed automatically responsive to trigger condition(s) (e.g., authorization by the analyst) being met. Based on the actions associated with the suggested steps, records, indicators, investigation notes and the like may be created or modified.

In an embodiment, security actions taken by the analyst and/or authorized by the analyst to be automatically performed related to, for example, updating incident fields, adding investigation notes, running single step actions, and so forth can be fed into a machine learning model to facilitate dynamic generation of workflows for subsequently observed incidents of a similar nature. For example, actions taken by the analyst on an incident at each step of a workflow may be recorded. Then, when a similar incident is observed, the machine learning model may be used to fit the new sequence onto the same graph. Additionally, if discrepancies are seen, the machine-learning model may evaluate the outcome of the previous step and current state of attributes on the incident to identify a deciding factor for branching to an alternate path.

In embodiments, the recommendation for the next step may be shown to the analyst as a suggestion and the analyst may accept or reject the suggestion with a reason. This allows the machine-learning model to enhance its reasoning by adding the analyst-supplied reason to the decision making processing for picking the next step in the generated workflow. As those skilled in the art will appreciate, over time, as the machine-learning model is trained based on actions taken, accepted and/or rejected by analysts regarding a variety of incidents being investigated through the SOAR platform, the workflow generated and next steps suggested will become more and more accurate.

In one embodiment, the machine learning model also learns and updates playbooks as SOC policies and procedures change over time. This can be leveraged for automating generation of the playbooks over time, without having to explicitly write playbooks. Further, the playbooks can also be exported and edited as required. In addition, next step suggestions based on previous learning in the playbook can be used to train new analysts who can refer to the suggestions to understand what steps have been historically taken by experienced analysts in connection with investigation of various types of the incidents.

Figure 3D:
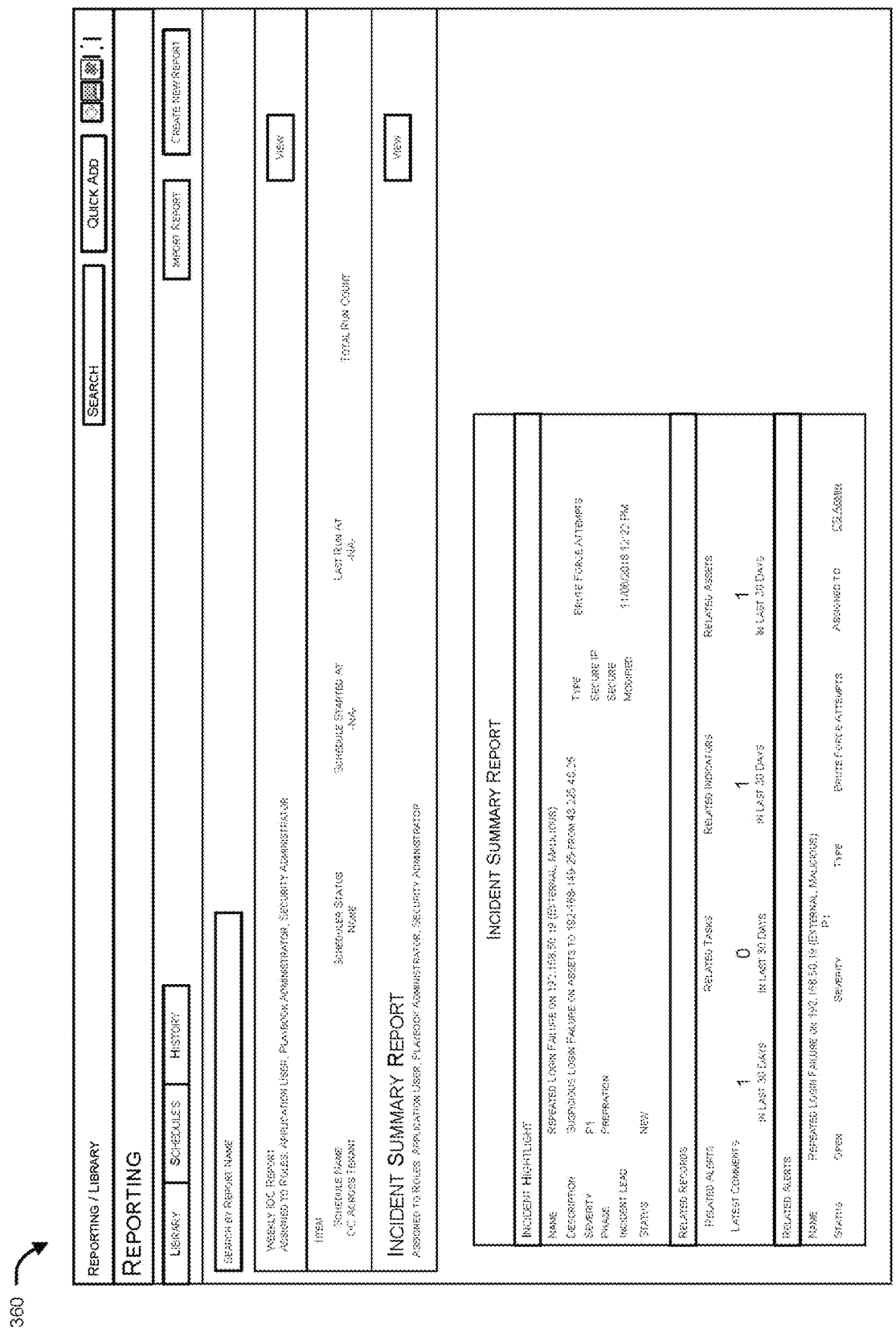

In FIG. 3D, screen shot 360 illustrates an example of an incident summary report that presents a brief summary of the actions taken to counter a particular incident. In the context of the present example, the incident summary report is a weekly incident of compromise (IOC) report, providing incident highlights, related records, and related alerts.

Figure 4A:
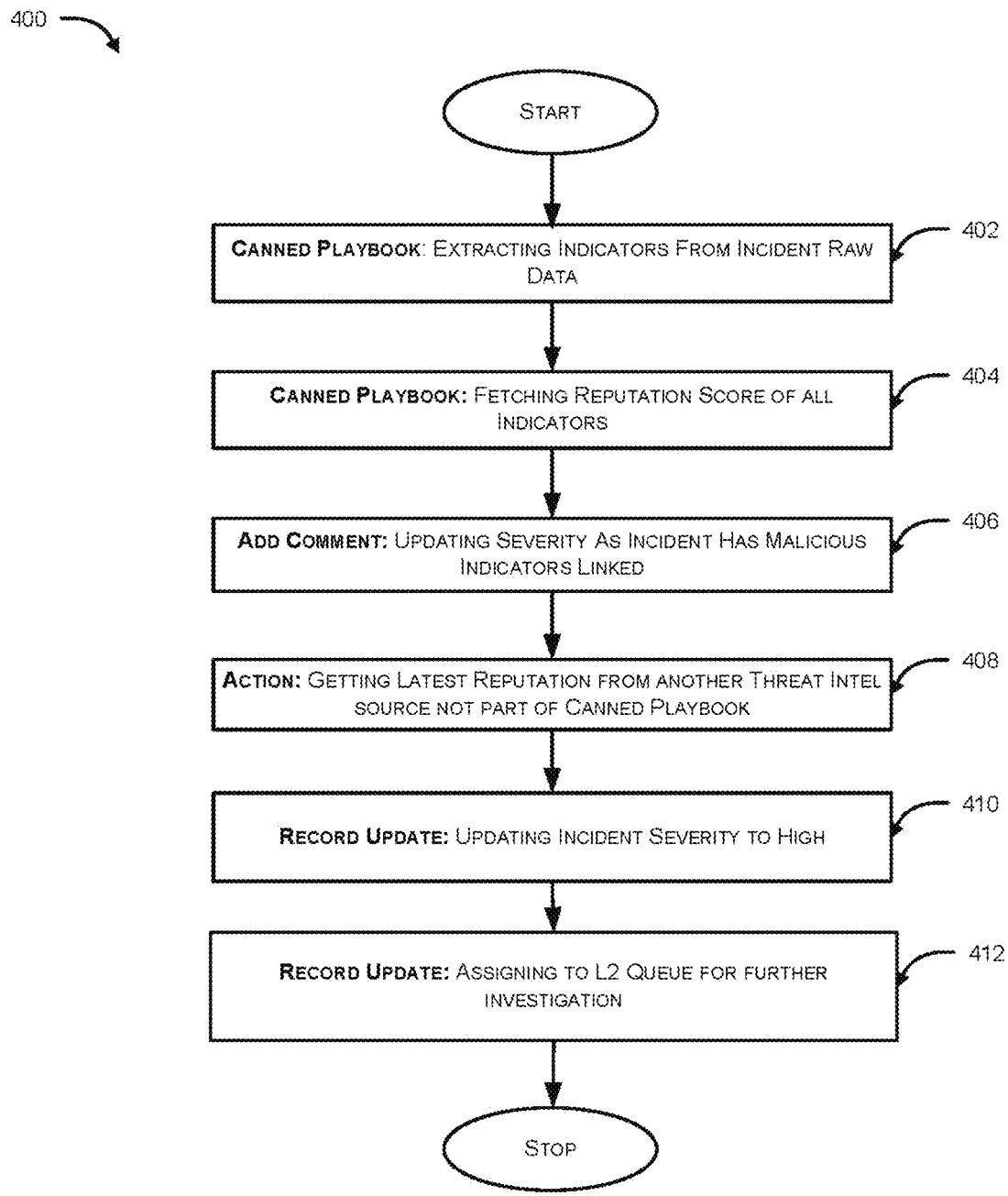
FIG. 4A is a flow diagram illustrating an exemplary process followed by an analyst to investigate a new incident in accordance with an embodiment of the present invention.

FIG. 4A is a flow diagram 400 illustrating a process that may be followed by an analyst to investigate a new incident in accordance with an embodiment of the present invention.

In the context of the present example, at block 402, an analyst can run a canned playbook to extract all indicators from incident raw data.

At block 404, the analyst can run another canned playbook to fetch reputation scores of the indicators associated with the incident at issue from multiple pre-configured threat intelligence platforms.

At block 406, the analyst can add a comment to an incident. For example, if the incident has linked malicious indicators, the analyst may indicate he/she is updating the severity due to the linked malicious indicators.

At block 408, the analyst can further confirm the reputation of the malicious indicators from additional available threat intelligence platforms that may not be part of the canned playbook of block 404 by executing direct connector actions.

At block 410, based on above findings, the analyst may update the record for the incident at issue by, for example, updating the severity of the incident to high.

At block 412, the analyst may further update the record. For example, in the context of the present example, the analyst may assign the incident to a next level queue (e.g., a level 2 (L2) queue) for further investigation by an L2 analyst.

Figure 4B:
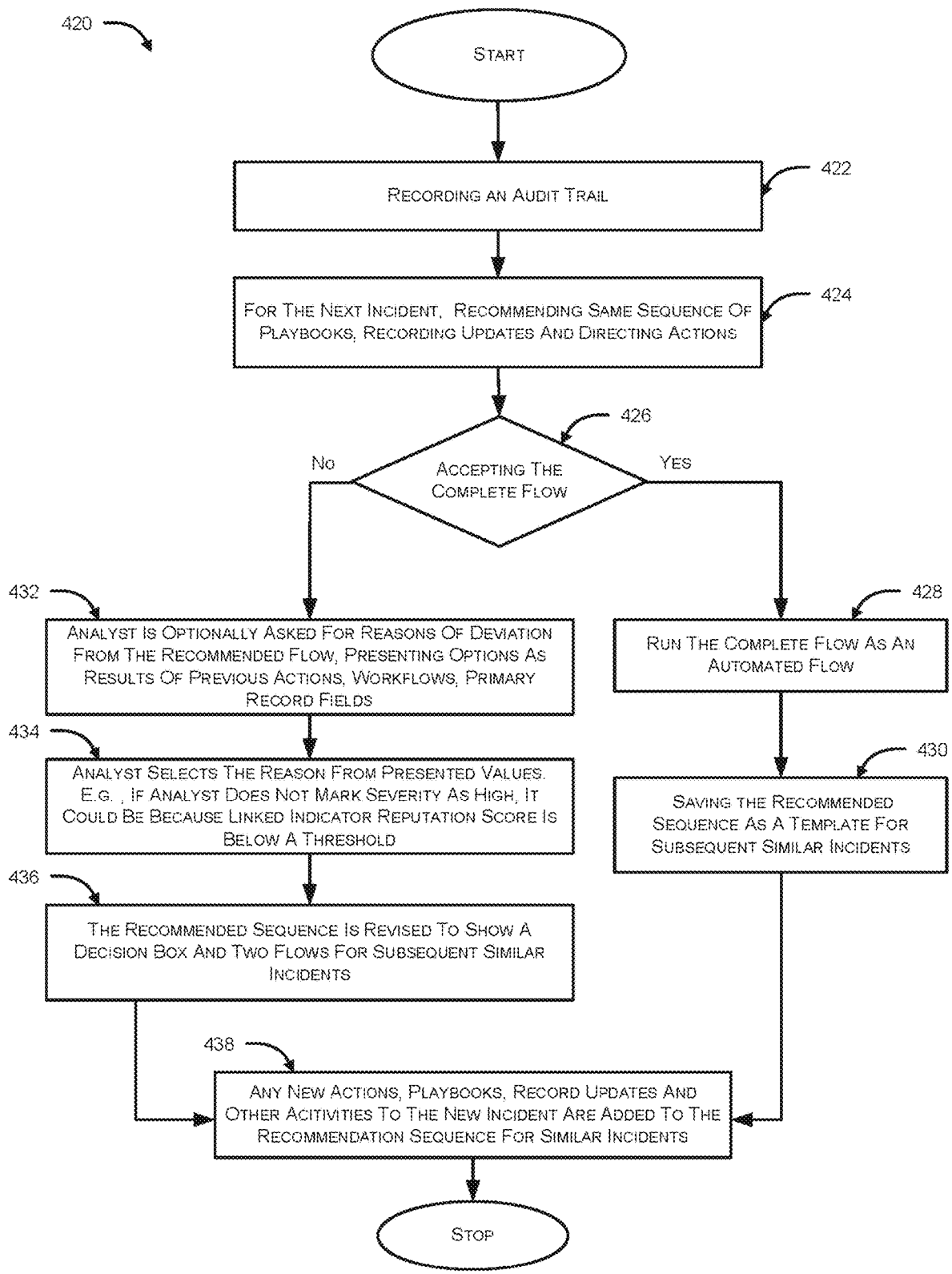
FIG. 4B is a flow diagram illustrating an exemplary process for generating a playbook for subsequent incidents in accordance with an embodiment of the present invention.

FIG. 4B is a flow diagram 420 illustrating an exemplary process for generating a playbook for subsequent incidents in accordance with an embodiment of the present invention. In the context of the present example, at block 422 an audit trail may be recorded. For example, a set of actions taken by the analyst (e.g., those taken in FIG. 4A) can be captured by a dynamic playbook generation engine (e.g., playbook generating engine 218).

At block 424, for a next (or subsequent) incident, the same sequence of playbooks may be recommended, including recording updates and directing actions. For example, a similarity between the next incident and previously observed incidents may be determined and the engine can recommend the same sequence of playbooks (or subset thereof) to be used for a previously observed incident that meets a predetermined or configurable similarity threshold.

At decision block 426, it is determined whether the analyst accepts the complete flow. For example, based on the recommended sequence of steps suggested at block 424, the analyst may provide an indication via a GUI regarding his/her acceptance or rejection of the suggested flow. When the suggested flow is accepted, processing continues with block 428; otherwise, when the suggested flow is rejected, processing continues with block 432.

At block 432, the analyst may be optionally prompted for reasons regarding the analyst for deviation from the recommended flow. For example, the analyst may be presented with options (e.g., results of previous actions, workflows, and primary record fields) from which to select.

At block 434, the analyst can select one of reasons from the options presented at block 432. For example, when a linked indicator has a reputation score that is below a threshold, the analyst may decide not to update the severity of the incident at issue as high and may so indicate.

At block 436, the recommended sequence of playbooks may be revised for subsequent incidents. For example, based on the selection at block 434, the recommended sequence of playbooks may be revised to show a decision box (e.g., prompting the analyst to review the reputation score of the linked indicator(s)) before updating the severity of the incident to high.

At block 438, any new actions, playbooks, record updates and other activities corresponding to the incident at issue are added to a recommendation sequence for the subsequent similar incidents.

When at block 428, the analyst has accepted the recommended flow, as such the complete flow is run as an automated flow.

At block 430, the recommended sequence is saved as a template for subsequent similar incidents. Additionally, the score of the playbook of the recommended sequence may be adjusted as a result of the acceptance.

Figure 4C:
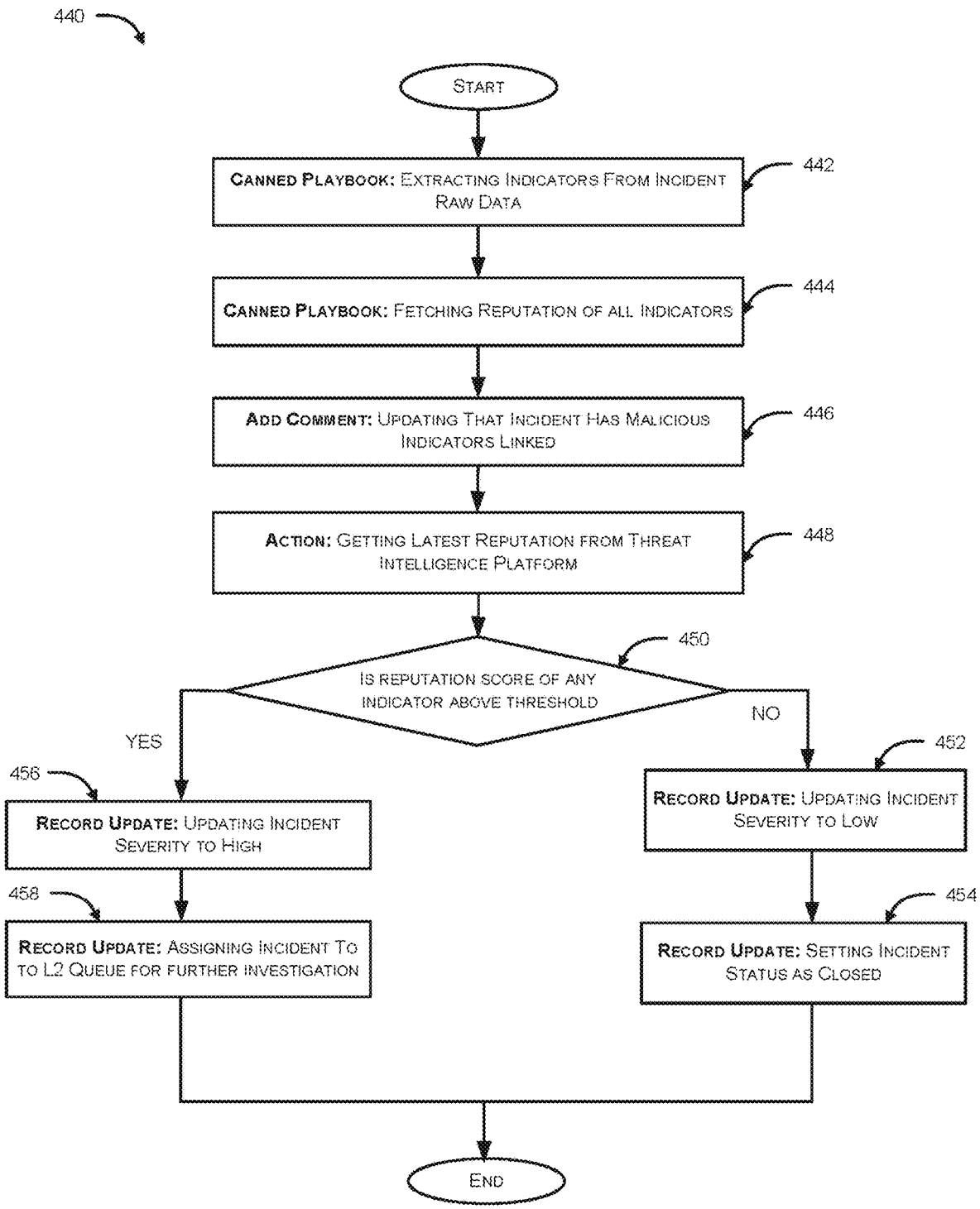
FIG. 4C is a flow diagram illustrating an exemplary process followed on detection of a subsequent similar incident to that processed in FIGS. 4A and 4B in accordance with an embodiment of the present invention.

FIG. 4C is a flow diagram illustrating an exemplary process followed on detection of a subsequent similar incident to that processed in FIGS. 4A and 4B in accordance with an embodiment of the present invention. In the context of the present example, FIG. 4C includes a new decision block 450 as compared to FIG. 4A as a result of the revision (at block 436 of FIG. 4C) of the recommended sequence of playbooks. For example, based on the selection at block 434, the recommended sequence of playbooks may be revised to show a decision box (e.g., prompting the analyst to review the reputation score of the linked indicator(s)) before updating the severity of the incident to high. Blocks 442-448 generally correspond to automated versions of blocks 402-408 of FIG. 4A.

At decision block 450, an evaluation of the reputation scores of the indicators are evaluated against a threshold. For example, in one embodiment, when the reputation score of any of the indicators exceed the threshold, then processing continues with block 456; otherwise, processing continues with block 452. In alternative embodiments, more than one (or all) of the indicators may be required to exceed the threshold.

At block 456, the record for the incident at issue may be updated to reflect the incident at issue is a high severity incident.

At block 458, the record may be further updated. For example, in the context of the present example, the record may be updated to assign the incident to an L2 queue for further investigation by an L2 analyst.

In the context of the present example, at block 452, when the condition of decision block 450 has not been met, the record for the incident at updated to reflect the incident is a low severity incident At block 454, the record may be further be updated to mark the incident status as closed.

Figure 4D:
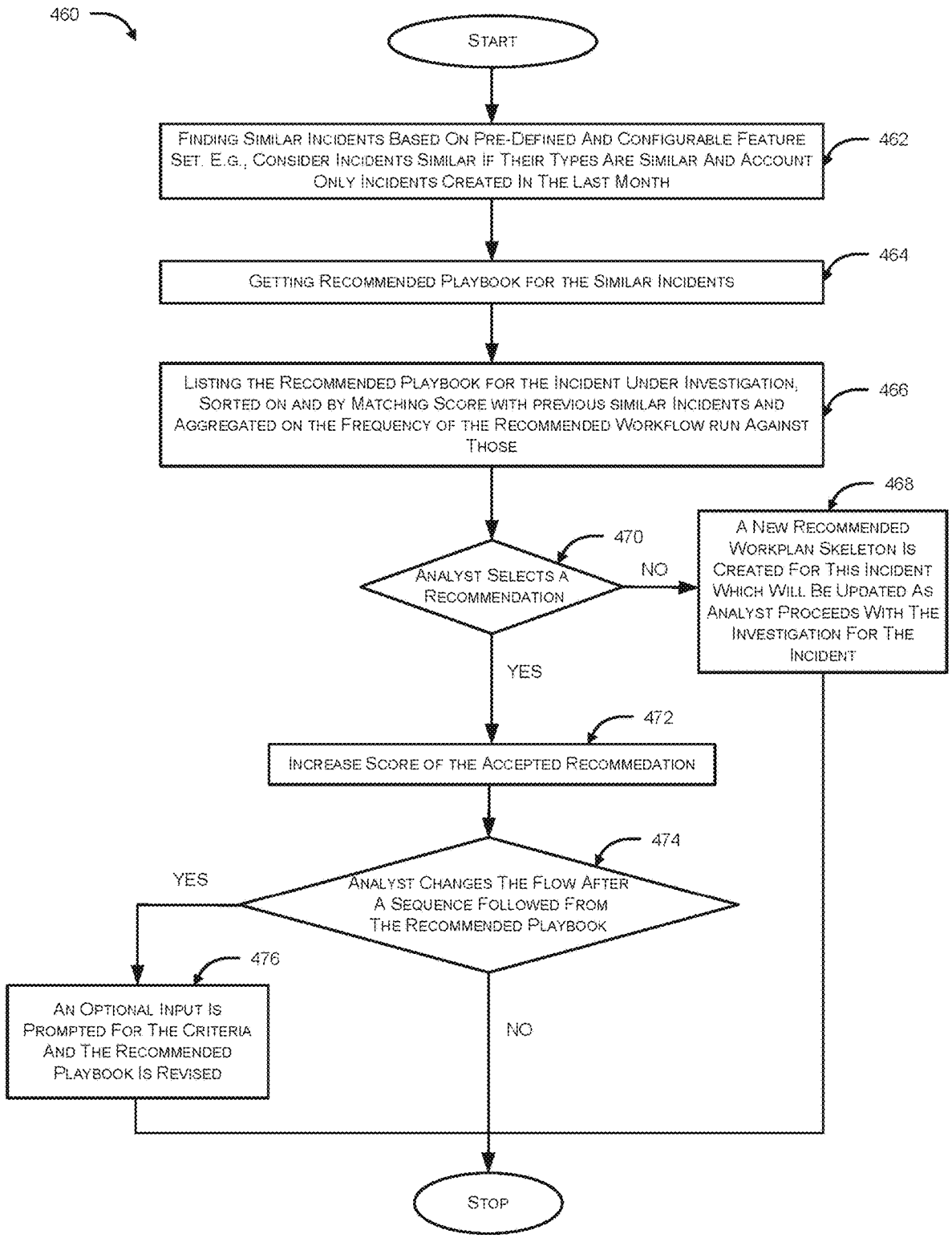
FIG. 4D is a flow diagram illustrating an exemplary process for recommending a playbook for an incident in accordance with an embodiment of the present invention.

FIG. 4D is a flow diagram illustrating an exemplary process for recommending a playbook for an incident in accordance with an embodiment of the present invention. In the context of the present example, at block 462, similar incidents to the incident at issue are identified based on the predefined or configurable feature set. For example, the features of the incident at issue may be extracted and fed to a machine-learning model (e.g., machine learning engine 214) to identify a previously encountered incident that meets a predefined or configurable similarity threshold. According to one embodiment only previously encountered incidents created within a predefined or configurable timeframe (e.g., one or more weeks or one or more months) and that have a similar type may be considered similar. In alternative embodiments, other features and timeframes may be used. A similarity score or matching score may be calculated for each of the similar incidents.

At block 464, recommended playbooks associated with the identified similar incidents are obtained. For example, a recommendation engine (e.g., recommendation sequence generating engine 216) may retrieve the playbooks form a database (e.g., database 210).

At block 466, the recommended playbooks for the incident under investigation may be listed and presented to the analyst. In one embodiment, the recommended playbooks may be sorted in order of their degree of similarity to the incident at issue. Additionally, a matching score for the recommended playbooks can be calculated to include a frequency for the recommended playbook. Depending upon the particular implementation, the frequency may represent a number of times the recommended playbook has been accepted during a prior incident investigation or a total number of times the playbook has been listed as a recommendation across all similar incidents.

At decision block 470, a determination is made regarding whether the analyst has selected one of the listed recommended playbooks. If so, processing continues with block 472; otherwise, processing branches to block 468.

At block 468, a new recommended work plan skeleton can be created for the incident, which can be updated as the analyst proceeds with investigation for the incident.

At block 472, the score of the accepted playbook may be increased and the same can be stored as the recommendation playbook in the recommendation engine against subsequent incidents.

At decision block 474, it is determined if the analyst changes the flow. For example, if the analyst follows some subset of steps of the recommendation and then deviates from the flow, processing continues with block 476; otherwise, if the analyst does not change the flow, then processing is complete.

At block 476, the analyst may be optionally prompted for the criteria that caused the deviation (e.g., incident state, and results of previous steps) and the recommended playbook may be revised as appropriate, for example, as discussed above with reference to blocks 434 and 436 of FIG. 4B. Additionally, in one embodiment any new actions run by the analyst can be captured as an alternate path from the decision block. The revised playbook can then be saved as a recommended playbook against subsequent incidents.

Figure 5:
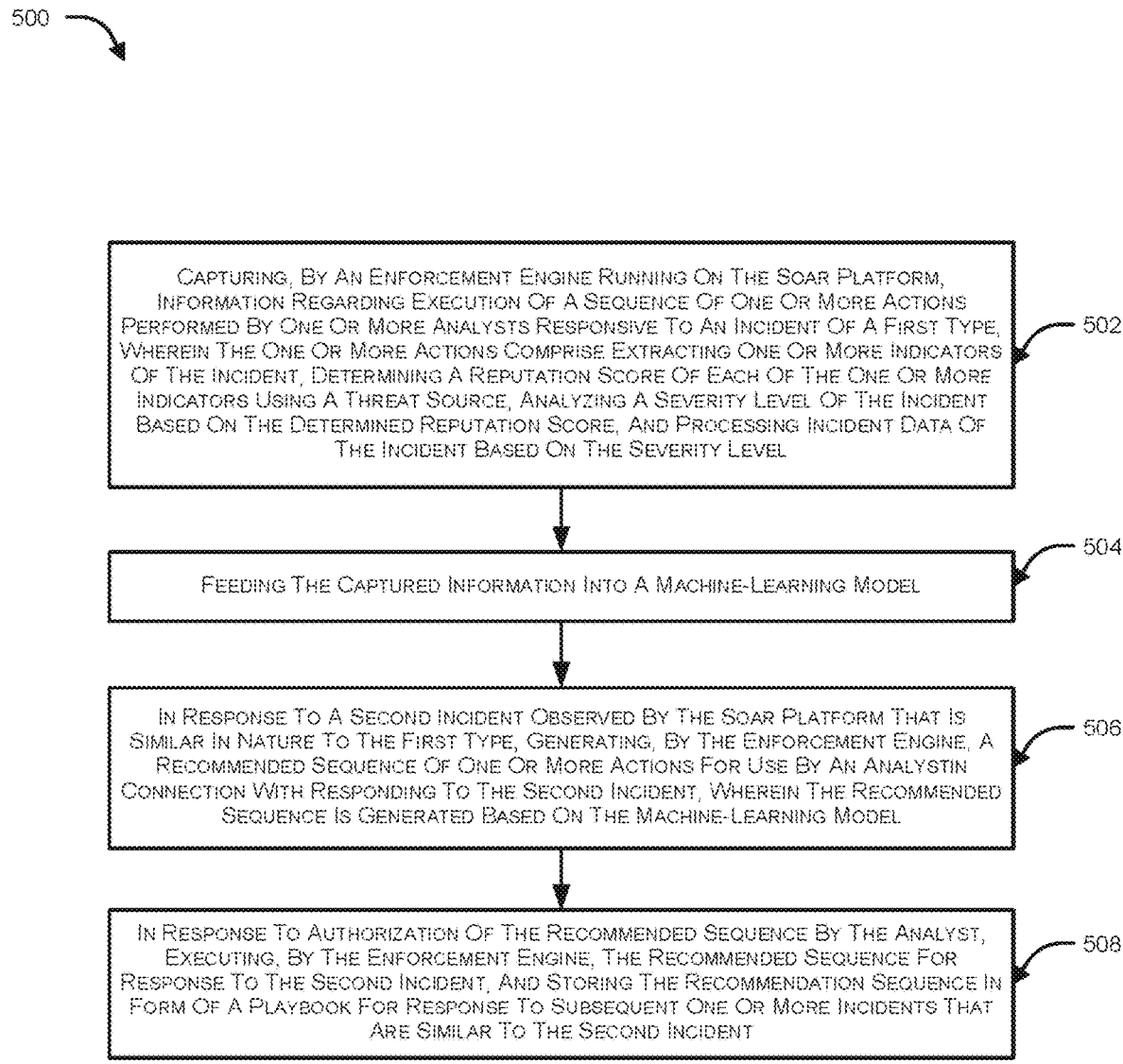
FIG. 5 is a flow diagram illustrating a process for generating incident-based playbook for a SOAR platform in accordance with an embodiment of the present invention.

FIG. 5 is a flow diagram 500 illustrating a method for generating a playbook to facilitate incident response by a SOAR platform in accordance with an embodiment of the present invention. In the context of the present example, at block 502, an enforcement engine (e.g., enforcement engine 208) running on a SOAR platform captures information regarding execution of a sequence of one or more actions performed by one or more analysts responsive to an incident of a first type. The one or more actions may include extracting one or more indicators of the incident, determining a reputation score of each of the one or more indicators using a threat source, analyzing a severity level of the incident based on the determined reputation score, and processing incident data of the incident based on the severity level. At block 504, the captured information is fed into a machine-learning model. Further, at block 506, when a second incident observed by the SOAR platform is similar in nature to the first type, the enforcement engine generates a recommended sequence of one or more actions for use by an analyst in connection with responding to the second incident. The recommended sequence may be generated based on the machine-learning model. At block 508, in response to authorization of the recommended sequence by the analyst, the enforcement engine automatically executes the recommended sequence in connection with the response to the second incident and stores the recommendation sequence in form of a playbook for response to subsequent one or more incidents that are similar to the second incident.

Figure 6:
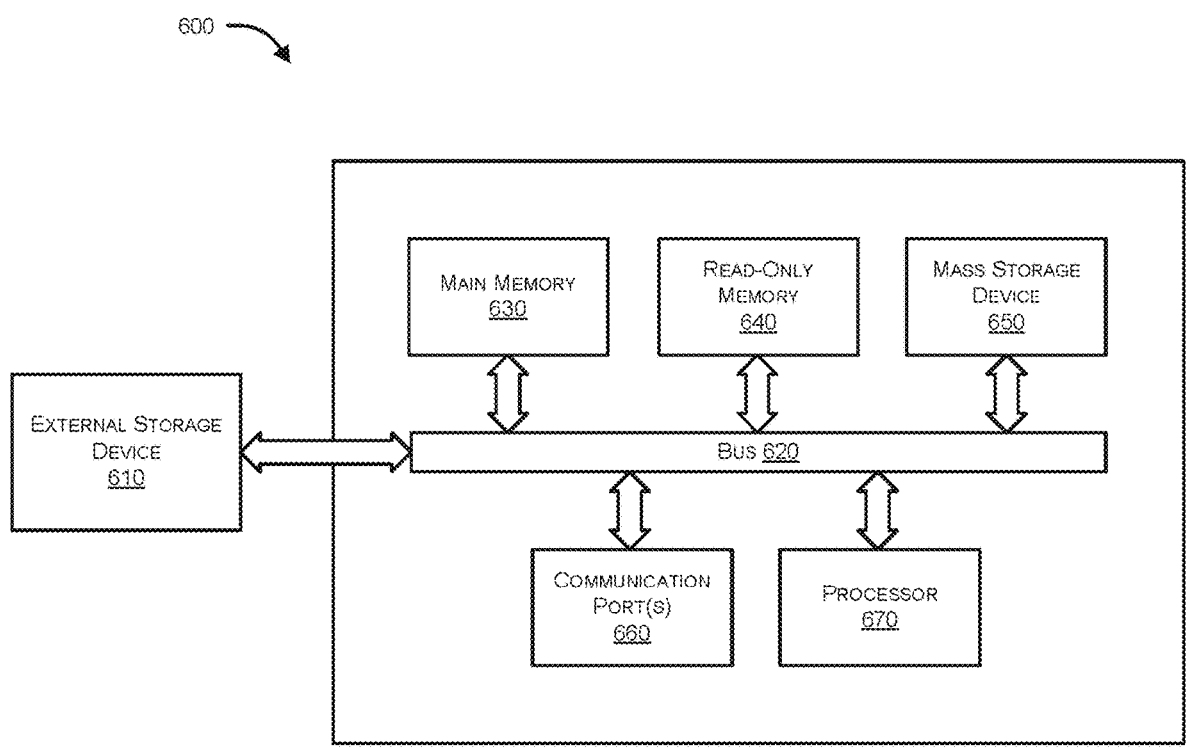
FIG. 6 illustrates an exemplary computer system in which or with which embodiments of the present invention may be utilized.

FIG. 6 illustrates an exemplary computer system 600 in which or with which embodiments of the present invention may be utilized. The computer system 600 may represent some portion of a server or computer system associated with a SOAR platform (e.g., SOAR platform 102) to implement on or more processes described herein.

As shown in FIG. 6, computer system includes an external storage device 610, a bus 620, a main memory 630, a read only memory 640, a mass storage device 650, a communication port 660, and a processor 670.

Those skilled in the art will appreciate that computer system 600 may include more than one processor 670 and communication ports 660. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention.

Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g. start-up or BIOS instructions for processor 670.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method for generating a playbook to facilitate incident response by a Security Orchestration, Automation and Response (SOAR) platform, the method comprising:

capturing by the SOAR platform information regarding execution of a sequence of one or more actions performed by one or more analysts responsive to a first incident of a first type, wherein the one or more actions comprise extracting one or more indicators of the first incident, determining a reputation score of each of the one or more indicators using a threat source, analyzing a severity level of the first incident based on the determined reputation score, and processing incident data of the first incident based on the severity level;

feeding the captured information into a machine-learning model;

in response to a second incident observed by the SOAR platform that is similar in nature to the first incident or the first type, generating a recommended sequence of one or more actions for use by an analyst in connection with responding to the second incident, wherein the recommended sequence is generated based on the machine-learning model; and in response to rejection of the recommended sequence by the analyst, revising the recommended sequence based on input provided by the analyst and storing the revised recommendation sequence in a form of a revised playbook for response to subsequent incidents that are similar to the second incident.

2. The method of claim 1, further comprising in response to authorization of the recommended sequence by the analyst, programmatically executing the recommended sequence in connection with responding to the second incident and storing the recommended sequence in a form of a playbook for use in connection with responding to subsequent incidents that are similar to the second incident.

3. The method of claim 1, wherein when the recommended sequence is not authorized by the analyst, the method comprises:

recording investigation notes including prompting the analyst to input a rationale for not authorizing the recommended sequence;

modifying the recommended sequence; and updating the playbook with the modified recommended sequence.

4. The method of claim 1, wherein the method further comprises executing the playbook for a subsequent incident of the one or more subsequent incidents when any of the reputation scores of the one or more indicators exceeds a pre-defined or configurable threshold.

5. The method of claim 4, wherein in response to detection of the subsequent incident, the method further comprises:

determining one or more incidents similar to the subsequent incident using a pre-defined or configurable feature set;

extracting a recommended playbook for the subsequent incident based on any or a combination of a similarity score of each of the one or more incidents similar with the subsequent incident and a frequency score of corresponding playbooks of each of the one or more incidents; and in response to extracting the recommended playbook from the corresponding playbooks of each of the one or more incidents, incrementing the frequency score of the extracted playbook.

6. The method of claim 5, wherein in response to modifying the recommended playbook by the analyst, the method comprises:

recording an analyst-defined reasoning associated with modifying of the recommended playbook; and storing the modified recommended playbook for the one or more incidents that are similar to the subsequent incident.

7. The method of claim 1, wherein the recommendation sequence is additionally based on the any of a combination of an analyst-defined reasoning associated with decision making, one or more policies defined for SOAR and one or more procedures defined for SOAR.

8. The method of claim 1, wherein the enforcement engine indicates the recommendation sequence as a suggestion on a graphical user interface (GUI).

9. A non-transitory computer-readable storage medium embodying a set of instructions, which when executed by a processing resource of a Security Orchestration, Automation and Response (SOAR) platform, causes the processing resource to perform a method comprising:
   capturing information regarding execution of a sequence of one or more actions performed by one or more analysts responsive to a first incident of a first type, wherein the one or more actions comprise extracting one or more indicators of the first incident, determining a reputation score of each of the one or more indicators using a threat source, analyzing a severity level of the first incident based on the determined reputation score, and processing incident data of the first incident based on the severity level;
   feeding the captured information into a machine-learning model;
   in response observing a second incident that is similar in nature to the first incident or the first type, generating a recommended sequence of one or more actions for use by an analyst in connection with responding to the second incident, wherein the recommended sequence is generated based on the machine-learning model; and
   in response to rejection of the recommended sequence by the analyst, revising the recommended sequence based on input provided by the analyst and storing the revised recommendation sequence in a form of a revised playbook for response to subsequent incidents that are similar to the second incident.

10. The non-transitory computer-readable storage medium of claim 9, wherein the method further comprises in response to authorization of the recommended sequence by the analyst, programmatically executing the recommended sequence in connection with responding to the second incident and storing the recommended sequence in a form of a playbook for use in connection with responding to subsequent incidents that are similar to the second incident.

11. The non-transitory computer-readable storage medium of claim 9, wherein when the recommended sequence is not authorized by the analyst, the method further comprises:
   recording investigation notes including prompting the analyst to input a rationale for not authorizing the recommended sequence;
   modifying the recommended sequence; and
   updating the playbook with the modified recommended sequence.

12. The non-transitory computer-readable storage medium of claim 9, wherein the method further comprises executing the playbook for a subsequent incident of the one or more subsequent incidents when any of the reputation scores of the one or more indicators exceeds a pre-defined or configurable threshold.

13. The non-transitory computer-readable storage medium of claim 12, wherein in response to detection of the subsequent incident, the method further comprises:
   determining one or more incidents similar to the subsequent incident using a pre-defined or configurable feature set;
   extracting a recommended playbook for the subsequent incident based on any or a combination of a similarity score of each of the one or more incidents similar with the subsequent incident and a frequency score of corresponding playbooks of each of the one or more incidents; and
   in response to extracting the recommended playbook from the corresponding playbooks of each of the one or more incidents, incrementing the frequency score of the extracted playbook.

14. The non-transitory computer-readable storage medium of claim 13, wherein in response to modifying the recommended playbook by the analyst, the method comprises:
   recording an analyst-defined reasoning associated with modifying of the recommended playbook; and
   storing the modified recommended playbook for the one or more incidents that are similar to the subsequent incident.

15. The non-transitory computer-readable storage medium of claim 9, wherein the recommendation sequence is additionally based on the any of a combination of an analyst-defined reasoning associated with decision making, one or more policies defined for SOAR and one or more procedures defined for SOAR.

16. The non-transitory computer-readable storage medium of claim 9, wherein the recommendation sequence is provided as a suggestion on a graphical user interface (GUI).

17. A system comprising:
   a processing resource; and
   a non-transitory computer-readable medium, coupled to the processing resource, having stored therein instructions that when executed by the processing resource cause the processing resource to perform a method comprising:
   capturing information regarding execution of a sequence of one or more actions performed by one or more analysts responsive to a first incident of a first type, wherein the one or more actions comprise extracting one or more indicators of the first incident, determining a reputation score of each of the one or more indicators using a threat source, analyzing a severity level of the incident based on the determined reputation score, and processing incident data of the first incident based on the severity level;
   feeding the captured information into a machine-learning model;
   in response observing a second incident that is similar in nature to the first incident or the first type, generating a recommended sequence of one or more actions for use by an analyst in connection with responding to the second incident, wherein the recommended sequence is generated based on the machine-learning model; and
   in response to rejection of the recommended sequence by the analyst, revising the recommended sequence based on input provided by the analyst and storing the revised recommendation sequence in a form of a revised playbook for response to subsequent incidents that are similar to the second incident.

18. The system of claim 17, wherein the method further comprises in response to authorization of the recommended sequence by the analyst, programmatically executing the recommended sequence in connection with responding to the second incident and storing the recommended sequence in a form of a playbook for use in connection with responding to subsequent incidents that are similar to the second incident.

19. The system of claim 17, wherein when the recommended sequence is not authorized by the analyst, the method further comprises:
- recording investigation notes including prompting the analyst to input a rationale for not authorizing the recommended sequence;
- modifying the recommended sequence; and
- updating the playbook with the modified recommended sequence.

20. The system of claim 19, wherein in response to detection of the subsequent incident, the method further comprises:
- determining one or more incidents similar to the subsequent incident using a pre-defined or configurable feature set;
- extracting a recommended playbook for the subsequent incident based on any or a combination of a similarity score of each of the one or more incidents similar with the subsequent incident and a frequency score of corresponding playbooks of each of the one or more incidents; and
- in response to extracting the recommended playbook from the corresponding playbooks of each of the one or more incidents, incrementing the frequency score of the extracted playbook.

\* \* \* \* \*